US006906441B2

(12) United States Patent  
Mendenhall

(10) Patent No.: US 6,906,441 B2  
(45) Date of Patent: Jun. 14, 2005

(54) SPHERICAL MOTOR USING OSCILLATORY MAGNETIC FIELDS

(75) Inventor: Todd L. Mendenhall, Rancho Palos Verde, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 118 days.

(21) Appl. No.: 10/442,032

(22) Filed: May 20, 2003

(65) Prior Publication Data

US 2004/0232790 A1 Nov. 25, 2004

(51) Int. Cl.$^7$ .............................................. H02K 17/44
(52) U.S. Cl. ...................... 310/112; 310/68 R; 310/261; 310/80
(58) Field of Search ............................... 310/112, 68 R, 310/80, 231, 261

(56) References Cited

U.S. PATENT DOCUMENTS

| | | | |
|---|---|---|---|
| 3,854,341 A | | 12/1974 | Quermann |
| 4,707,642 A | * | 11/1987 | Sorimachi et al. ............ 318/37 |
| 5,280,225 A | * | 1/1994 | Pine et al. .................. 318/575 |
| 5,410,232 A | | 4/1995 | Lee |
| 5,413,010 A | * | 5/1995 | Nakanishi et al. ........... 74/5.22 |
| 5,416,392 A | | 5/1995 | Lee et al. |
| 5,798,590 A | * | 8/1998 | Sakakibara ............ 310/156.19 |
| 5,808,395 A | * | 9/1998 | Anders et al. .............. 310/266 |

FOREIGN PATENT DOCUMENTS

| | | |
|---|---|---|
| EP | 0 526 774 A2 | 2/1993 |
| GB | 2 330 457 A | 10/1997 |
| WO | WO 02/31945 | 4/2002 |

OTHER PUBLICATIONS

Ebihara D. et al, "An Approach to Basic Design of the PM–type Spherical Motor", Proceedings of the 2001 IEEE Int'l Conf. on Robotics and Automation, ICRA 2001, Seoul, Korea, May 21–26, 2001; Proceedings of the IEEE Int'l Conf. on Robotics and Automation, New York, NY.; IEEE, US. vol. 1 of 4, May 21, 2001, pp. 1792–1797, XP 010550406.

* cited by examiner

Primary Examiner—Darren Schuberg  
Assistant Examiner—Nguyen Hanh  
(74) Attorney, Agent, or Firm—John A. Miller; Warn, Hoffmann, Miller, & LaLone, P.C.

(57) ABSTRACT

A spherical motor (10) that includes an outer field sphere (12) and an inner armature sphere (14) rotatable therein. Field magnetic elements (26) are disposed on the field sphere (12) and sensor/actuator magnetic elements (42) are disposed on the armature sphere (14). The field magnetic elements (26) include two coils (28, 30) providing regularly varying magnetic fields in two axes. The sensor/actuator magnetic elements (42) include coils (44–54) providing magnetic fields in three axes. Each sensor magnetic element (42) senses its localized magnetic field variations and generates a torque relative thereto. Over one complete field variation of the field magnetic elements (26), each sensor magnetic element (42) can produce torque about all three axes.

20 Claims, 3 Drawing Sheets

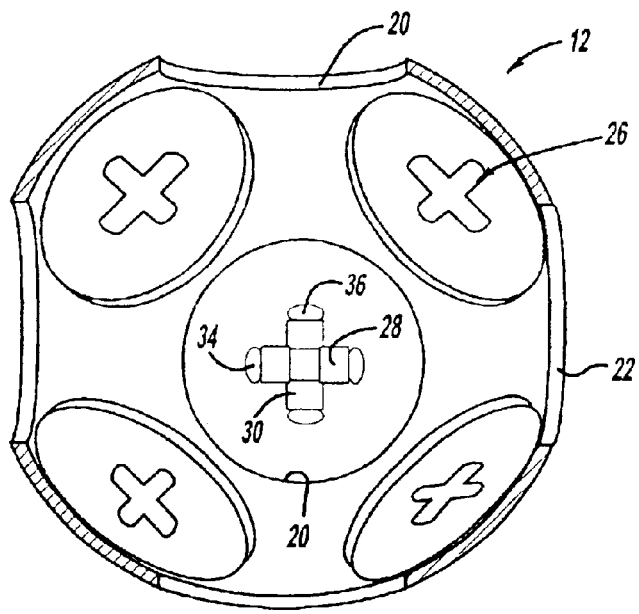
FIG - 2
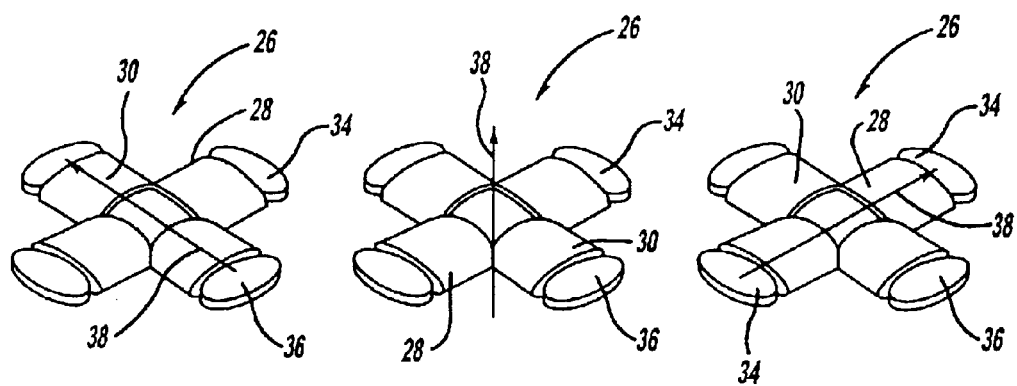
FIG - 3A  FIG - 3B  FIG - 3C

SPHERICAL MOTOR USING OSCILLATORY MAGNETIC FIELDS

BACKGROUND OF THE INVENTION

1. Field of the Invention

This invention relates generally to a spherical motor and, more particularly, to a spherical motor that includes a plurality of two-axis magnetic elements positioned on one of a field sphere or an armature sphere and a plurality of three-axis magnetic elements positioned on the other of the field sphere or the armature sphere, where the two-axis magnetic elements generate oscillating magnetic fields and the three-axis magnetic elements detect the oscillating magnetic fields and then provide an actuating magnetic torque to position the armature sphere.

2. Discussion of the Related Art

There is a need to accurately point various devices, such as antennas, sensors, detectors, etc., in a particular direction within a desired field of view. Currently, these devices are typically mounted on a two or three axis gimbal assembly where each axis includes a separate gimbal that is controlled by a separate motor to point the device in the desired direction. Such gimbal assemblies typically employ complex wrist and elbow joints that result in a relatively large and complex system sometimes unsuitable for certain applications.

Spherical motors are known in the art that require less space and can rotate and direct a device in three degrees of freedom. However, current spherical motor designs typically use extremely complex algorithms and modeling techniques that make their implementation difficult, impractical and cost prohibitive.

U.S. Pat. No. 5,410,232 issued to Smith illustrates this problem. The '232 patent discloses a spherical motor 10 including a spherical stator 12 surrounding a spherical rotor 18. Suitable bearings are provided so that the rotor 18 can rotate within the stator 12. A motor shaft 24 is mounted to the spherical rotor 18 and extends through a stator opening 26. The motor 10 provides three-axis positioning of the shaft 24 within the opening 26. The spherical rotor 18 includes a plurality of rotor magnets or poles 22 disposed on its outer surface, and the spherical stator 12 includes a plurality of stator poles 14 disposed on its inner surface. The stater poles 14 are controllable electric coils and the rotor poles 22 are permanent magnets defined by a magnetic core. The magnetic fields of the poles 14 and 22 interact to provide a torque on the rotor 18 to position the shaft 24.

The motor 10 includes an orientation sensing system 40 having a spherical grid pattern 42 provided on the outer surface of the rotor 18. The grid pattern 42 includes a set of symmetrically spaced radial lines continuously converging to a point P, where the motor shaft 24 is situated, and a set of parallel lines that are orthogonal to the radial lines. The system 40 uses a mathematical algorithm to determine the position of the rotor 18 relative to the grid pattern 42, and control the magnetic fields to position the shaft 24. Particularly, the system 40 uses the grid pattern 42 to determine the position of the rotor 18 and uses the magnetic field supplied to the rotor poles 22 to provide the desired torque.

The magnetic fields generated by the fixed magnet poles 22 are extremely complicated. Further, every time the rotor 18 moves, the magnetic field that the rotor 18 sees is different. Therefore, it is necessary to accurately know the position of the rotor 18 relative to the fixed poles 22. The sensing system 40 computes the magnetic field as seen by the rotor 18 each time the rotor 18 move. The rotor poles 22 are turned on and off to move the rotor 18 in the desirable direction. This operation requires a very elaborate position knowledge scheme for the rotor 18 employing complex algorithms. It would be desirable to provide a spherical motor that was much less complex to control.

SUMMARY OF THE INVENTION

In accordance with the teachings of the present invention, a spherical motor is disclosed that simultaneously provides motive torque in three degrees of freedom. The spherical motor includes an outer sphere and an inner sphere positioned therein, where one of the spheres is a stationary field sphere and the other sphere is a rotatable armature sphere. A first set of magnetic elements is formed on the outer sphere and a second set of magnetic elements is formed on the inner sphere. One set of the magnetic elements are field magnetic elements that include at least two coils providing magnetic fields in two axes. The other set of the magnetic elements are sensor/actuator magnetic elements that include three coils providing magnetic fields in three axes.

The field magnetic elements generate a regularly varying magnetic field. Each sensor magnetic element senses its localized magnetic field variations generated by the field magnetic elements and generates a torque relative thereto to rotate the armature sphere. Over one complete field variation of the field magnetic elements, each sensor magnetic element can produce torque about all three axes. Because each sensor magnetic element generates the required torque vector, no coordination is necessary between the two sets of magnetic elements.

Additional advantages and features of the present invention will become apparent from the following description and appended claims, taken in conjunction with the accompanying drawings.

BRIEF DESCRIPTION OF THE DRAWINGS

FIG. 2 is a perspective view of half of an outer field sphere removed from the spherical motor shown in FIG. 1 and including a plurality of field magnetic elements;

FIGS. 3(a)–3(c) are perspective views of one of the field magnetic elements shown in FIG. 2;

DETAILED DESCRIPTION OF THE EMBODIMENTS

The following discussion of the embodiments of the invention directed to a spherical motor is merely exemplary in nature, and is in no way intended to limit the invention or its applications or uses.

The present invention includes a spherical motor that provides three-degrees of freedom of rotation, but does not suffer the complexities of the spherical motors known in the art. As will be discussed in detail below, the spherical motor of the invention employs a plurality of field magnets that create oscillating magnetic fields that generate a voltage that is proportional to the derivative of the magnetic fields. Sensor/actuator magnets sense these oscillating magnetic fields over one complete oscillating magnetic field cycle. The sensor/actuator magnets then generate actuating magnetic fields that provide torque on the moving sphere of the motor to position it at the desired location. Thus, the motor does not need to employ a complex vision system that determines the position of the moving sphere of the motor.

Figure 1:
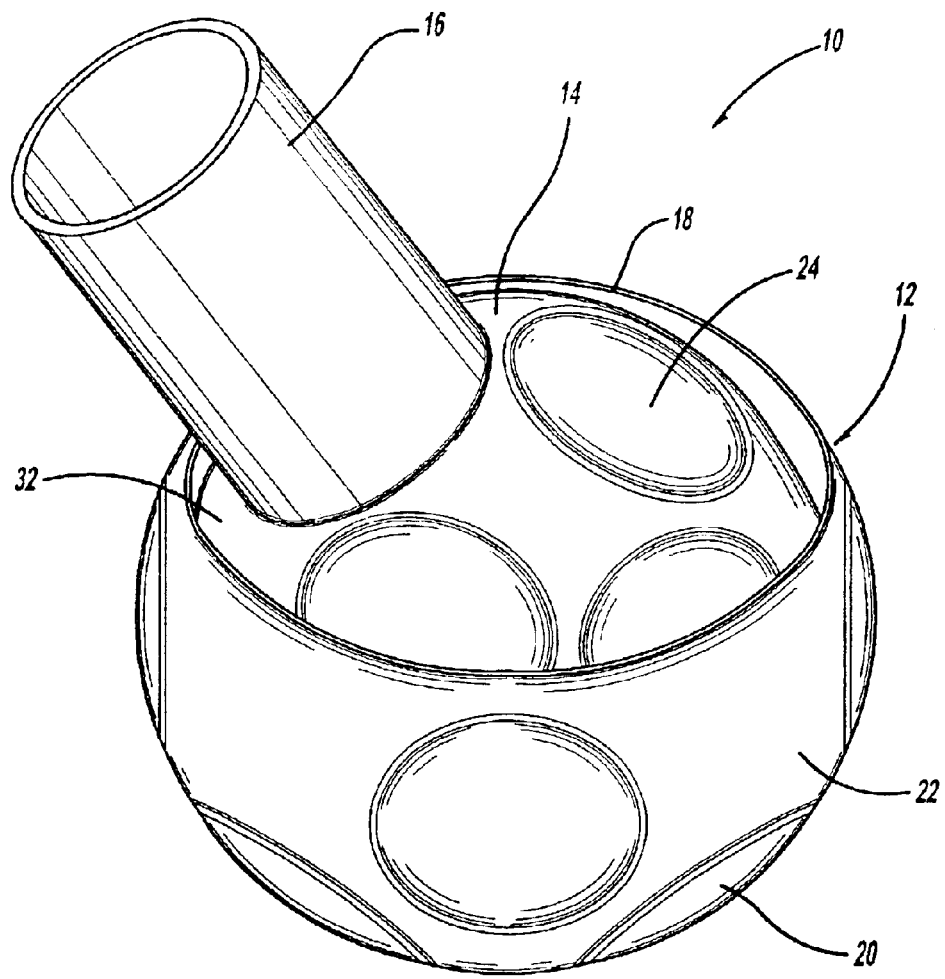
FIG. 1 is perspective view of a spherical motor, according to an embodiment of the present invention.

FIG. 1 is a perspective view of a spherical motor 10, according to an embodiment of the present invention. The spherical motor 10 includes an outer field sphere 12 and an inner armature sphere 14. As will become apparent from the discussion below, the term "sphere" as used herein also includes a portion of a complete sphere, and possibly less than half of a sphere. A gap is defined between the spheres 12 and 14 so that the armature sphere 14 is free to rotate within the field sphere 12 by any suitable mechanism, such as a forced air pocket, ball bearings, electrostatic repulsion, fluid bearings, etc. The field sphere 12 includes a plurality of symmetrically disposed magnetic regions 20 formed in an outer shell 22 of the sphere 12, and the armature sphere 14 includes a plurality of symmetrically dispose magnetic regions 24 formed in an outer shell 32 of the sphere 14. The diameter of the spheres 12 and 14 and the thickness of the shells 22 and 32 would be application specific, and can be any dimension suitable for the purposes described herein.

The armature sphere 14 includes a motor shaft 16 mounted to the shell 32 that extends through an opening 18 in the field sphere 12. A device (not shown) can be mounted to the shaft 16, so that it can be positioned in a particular direction by rotation of the sphere 14 in three-degrees of freedom. The device can be any device that requires pointing, such as a communications antenna, sensor, optical device, etc. Alternately, the device can be completely mounted within the armature sphere 14. Depending on the application and the configuration of the spheres 12 and 14, the device can be directed in any direction within a 360° field-of-view defined by the spheres 12 and 14. In a practical application, the pointing of the device would probably be limited to a field-of-view within 180°. As will be discussed in detail below, the spherical motor 10 employs a technique of detecting changing or oscillating magnetic fields to provide torque on the armature sphere 14 to position the device.

FIG. 2 is a perspective view of half of the field sphere 12 separated from the motor 10. A two-axis field magnetic element 26 is symmetrically positioned within each magnetic region 20. FIGS. 3(a)–3(c) show a perspective view of one of the magnetic elements 26 separated from the field sphere 12. Each magnetic element 26 includes a first coil 28 wrapped around a ferrite core 34, and a second coil 30 wrapped around a ferrite core 36, where the cores 34 and 36 are orthogonal to each other. However, as will be appreciated by those skilled in the art from the discussion herein, the coils 28 and 30 do not need to be orthogonal to each other for the spherical motor 10 to operate within the scope of the present invention.

In this embodiment, the field sphere 12 includes fourteen magnetic regions 20 each including a single magnetic element 26. However, this is by way of a non-limiting example in that a practical field sphere for a spherical motor probably would include many more magnetic regions 20 and magnetic elements 26. The symmetrical positioning of the magnetic regions 20 on the shell 22 is also by way of a non-limiting example in that the regions 20 and the elements 26 can be disposed on the shell 22 in any suitable configuration. The magnetic regions 20 generally define a confined area of the magnetic fields for each particular magnetic element 26, but the magnetic fields of the elements 26 can overlap without affecting the operation of the system 10. Further, a common voltage source can be employed to operate all of the magnetic elements 26.

The direction of the combined magnetic field from the coils 28 and 30 is determined by the direction of the current traveling through the coils 28 and 30 when a positive or negative voltage potential is applied thereto. In FIG. 3(a), the coil 30 is receiving a positive potential and the coil 28 is off, so that the direction of the current flow through the coil 30 creates a magnetic field 38 along the axis of the core 36. In FIG. 3(b), the coils 28 and 30 are both receiving a positive potential so that the direction of the current flow through the coils 28 and 30 creates the combined magnetic field 38 at a 45° angle relative to the axes of the cores 34 and 36 in the direction indicated. In FIG. 3(c), the coil 28 is receiving a positive potential and the coil 30 is off, so that the direction of the current flow through the coil 28 creates the magnetic field 38 along the axis of the core 34. If the coils 28 and 30 are wound in the opposite direction, then the magnetic field would be in the opposite direction for the same voltage potential.

As is apparent, if a negative voltage is also applied to the coils 28 and 30 in the manner as described herein the direction of the magnetic field 38 will rotate 360° in the plane of the cores 34 and 36. Thus, a two-axis field generator can be created by discreetly changing the potential applied to the coils 28 and 30 in the sequence (+, off), (+, +), (off, +), (−, +), (−, off), (−, −), (off, −), (+, −), where the magnetic field rotates in discreet 45° steps. The magnetic field 38 can also be caused to rotate continuously by applying a sinusoidal voltage potential to the coils 28 and 30 that are 90° apart in phase.

According to the invention, the relative orientation of the magnetic elements 26 and the rotating magnetic fields that they generate is not important. It is only necessary that the magnetic fields move so that they can be detected. Also, if the magnetic fields did not move, a torque could never be generated parallel to the magnetic fields due to the nature of the cross product magnetic torque law. By providing a moving magnetic field, an average torque can be generated in any direction. Further, the magnetic field 38 does not need to rotate 360° for the spherical motor 10 to operate according to the invention. Also, additional coils, including coils providing three-axis magnetic fields, can be employed in each magnetic element 26 to provide the moving magnetic field within the scope of the present invention.

Figure 4:
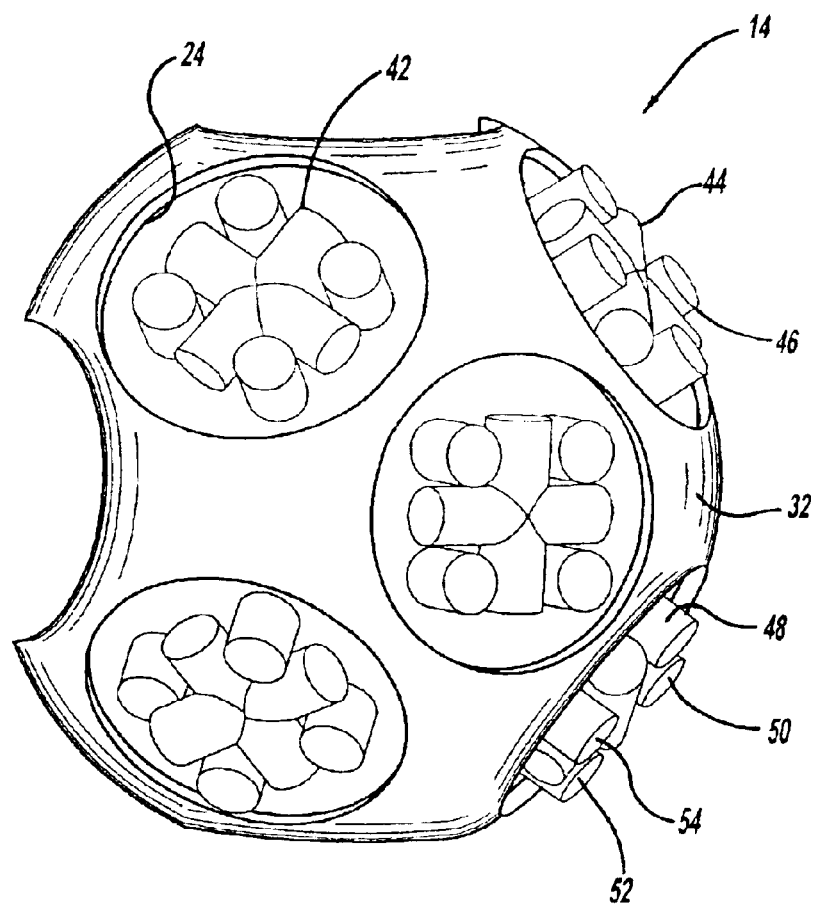
FIG. 4 is a perspective view of half of an armature sphere removed from the spherical motor shown in FIG. 1 and including a plurality of sensor/actuator magnetic elements.
Figure 5:
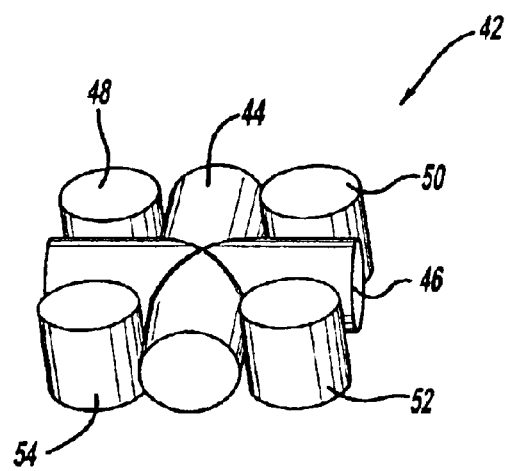
FIG. 5 is a perspective view of one of the sensor/actuator magnetic elements shown in FIG. 4.

FIG. 4 is a perspective view of a portion of the armature sphere 14 separated from the motor 10. Each of the plurality of magnetic regions 24 includes a three-axis sensor/actuator magnetic armature element 42 disposed therein. A perspective view of one of the magnetic elements 42 removed from the armature sphere 14 is shown in FIG. 5. Each sensor/actuator magnetic element 42 includes a first coil 44 wrapped around a core extending along a first axis, and a second coil 46 wrapped around a core extending in a second axis perpendicular to the first axis, as shown. Four separate coils 48, 50, 52 and 54 are positioned in each quadrant defined by the axes of the coils 44 and 46, where each coil 48–54 is wrapped around a core extending along an axis perpendicular to both the first and second axes to provide the three axes. Therefore, the magnetic element 42 senses or provides a magnetic field in any direction.

The sensor/actuator magnetic elements 42 are used to sense local magnetic field properties and produce torque about all three axes. Because the magnetic fields generated by the magnetic elements 26 are moving, the magnetic elements 42 can sense the direction of a localized magnetic field around it. The elements 26 can then use their magnetic fields to generate a torque relative to the moving magnetic fields to move the armature sphere 14 relative to the field sphere 12. In one embodiment, each magnetic element 42 will sense its localized magnetic field through one complete cycle of the moving magnetic field.

When the elements 42 are sensing, a control system (not shown) records the voltages on the coils 44–54 as the localized magnetic field for that element 42 moves through its cycle. If a magnetic armature element 42 is sensing the magnetic field of one of the magnetic field elements 26, it will determine the direction of the magnetic field 38 as it moves relative to the coils 28 and 30. The control system then calculates the magnetic field as it appears locally to that particular armature element 42, and assumes it will be the same for the next cycle. In other words, the control system knows where the magnetic field is because the localized magnetic fields are rotating at a particular rate.

After measuring for one complete cycle, the armature magnetic elements 42 will then generate an actuating magnetic field in a particular direction that interacts with the field magnetic element fields, so that the magnetic fields cause a torque on the armature sphere 14. In other words, the control system will apply a voltage potential to the coils 44–54 in each of the magnetic elements 42 so that for the next cycle of the moving magnetic field, which will now be known by the system, a desired torque can be applied to the armature sphere 14 to position the shaft 16. Thus, any torque in any direction can be generated by the system.

In this embodiment, the magnetic elements 42 are sensing the magnetic fields for one cycle of the magnetic fields, and then actuating the armature sphere 14 for the next cycle of the magnetic fields in an alternating sequence. The magnetic elements 42 can all be sensing and then all be actuating together. Alternatively, some of the magnetic elements 42 can be sensing while other of the magnetic elements 42 are actuating.

During the sensing phase, each magnetic element 42 is sensing the magnetic field around it, which may be provided by one or more of the field elements 26. Therefore, the orientation of the field elements 26 on the shell 22 is not important. Because each element 42 generates the desired torque vector, no coordination is necessary between the various armature elements 42. Once the global torque requests to the motor 10 is transformed into a local actuator set reference frame, a simple local controller can manipulate the coils 44–54 in the armature elements 42 to generate a torque vector parallel to the torque requested to position the shaft 16.

As discussed above, when a magnetic element 42 acts as sensing elements and then as an actuating element, the motor 10 has a 50% duty cycle in that the magnetic elements 42 will be sensing half the time and actuating the other half of the time. The duty cycle can be varied by changing the sensing and actuating times. In an alternate embodiment, the magnetic elements 42 can be providing actuation continuously. In this embodiment, the armature elements 42 do not sense the oscillating magnetic fields generated by the field elements 26, but sense the back electromotive force (EMF) generated by the field elements 26. It is still necessary that magnetic fields are moving. Thus, by sensing the back EMF of the magnetic fields generated by the field elements 26, the armature elements 42 are sensing and actuating at the same time.

Variations of the embodiments discussed above can be made within the scope of the present invention. For example, the outer sphere can be the armature sphere that moves relative to the inner, field sphere. The three-axis magnetic elements 42 and the two-axis magnetic elements 26 can be positioned on either the field sphere or the armature sphere, regardless which of the inner and outer sphere is the field sphere 12 and the armature sphere 14. Further, the field sphere 12 and the armature sphere 14 do not need to have the identical distribution of magnetic elements thereon. The number of field magnetic elements 26 and armature magnetic elements 42 will be determined for different applications. If the requested torque is going to be calculated in the base frame, it may make more sense to have the outer sphere be the armature sphere. However, if the requested torque is going to be calculated in the reference frame, it may make more sense for the inner sphere to be the armature sphere.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A spherical motor comprising:
    an outer field sphere, said outer field sphere including a plurality of field magnetic elements disposed thereon; and
    an inner armature sphere positioned within the outer field sphere, said inner armature sphere being rotatable within the outer field sphere, said inner armature sphere including a plurality of armature magnetic elements, wherein one of the plurality of field magnetic elements or armature magnetic elements are at least two-axis magnetic elements and the other of the field magnetic elements or the armature magnetic elements are three-axis sensor/actuator magnetic elements, said two-axis magnetic elements generating a moving magnetic field and said sensor/actuator magnetic elements sensing the moving magnetic fields and generating actuator magnetic fields to provide a torque to move the armature sphere relative to the field sphere.

2. The motor according to claim 1 wherein the two-axis magnetic elements include a first coil wrapped around a core extending in one direction and a second coil wrapped around a core extending in an orthogonal direction.

3. The motor according to claim 1 wherein the sensor/actuator magnetic elements include a first coil wrapped around a core extending in a first direction, a second coil wrapped around a core extending in a second direction orthogonal to the first direction and at least one third coil wrapped around a core extending in a direction perpendicular to the first direction and the second direction.

4. The motor according to claim 3 wherein the at least one third coil is four coils, where one of the four third coils is positioned in each quadrant defined by the intersection between the first and second directions.

5. The motor according to claim 1 wherein the plurality of field magnetic elements are symmetrically disposed on the field sphere and the plurality of armature magnetic elements are symmetrically disposed on the armature sphere.

6. The motor according to claim 1 wherein the armature sphere includes a shaft extending through an opening in the field sphere.

7. The motor according to claim 1 wherein the field sphere is about a half hemisphere of a total sphere.

8. The motor according to claim 1 wherein sinusoidal signals 90° apart in phase are applied to the field magnetic elements to generate the continuously moving magnetic field.

9. The motor according to claim 1 wherein the sensor magnetic elements sense the back EMF created by the field magnetic elements.

10. A spherical motor comprising:

an outer sphere, said outer sphere being one of a stationary field sphere or a movable armature sphere, said movable armature sphere being rotatable relative to the stationary field sphere, said outer sphere including a plurality of outer magnetic elements disposed thereon; and an inner sphere positioned within the outer sphere, said outer sphere being the other one of a stationary field sphere or a movable armature sphere, said inner sphere including a plurality of inner magnetic elements being disposed thereon, wherein one of the plurality of outer magnetic elements or inner magnetic elements are at least two-axis magnetic elements and the other of the outer magnetic elements or the inner magnetic elements are three-axis sensor/actuator magnetic elements, said two-axis magnetic elements generating a moving magnetic field and said three-axis magnetic elements sensing the moving magnetic fields and generating actuator magnetic fields to provide a torque to move the movable sphere relative to the stationary sphere.

11. The motor according to claim 10 wherein the two-axis magnetic elements include a first coil wrapped around a core extending in one direction and a second coil wrapped around a core extending in an orthogonal direction.

12. The motor according to claim 10 wherein the sensor/actuator magnetic elements include a first coil wrapped around a core extending in a first direction, a second coil wrapped around a core extending in a second direction orthogonal to the first direction and at least one third coil wrapped around a core extending in a direction perpendicular to the first direction and the second direction.

13. The motor according to claim 12 wherein the at least one third coil is four coils, where one of the four third coils is positioned in each quadrant defined by the intersection between the first and second directions.

14. The motor according to claim 10 wherein the plurality of two-axis magnetic elements are symmetrically disposed on the outer sphere or the inner sphere and the plurality of three-axis magnetic elements are symmetrically disposed on the outer sphere or the inner sphere.

15. The motor according to claim 10 wherein the inner sphere includes a shaft extending through an opening in the outer sphere.

16. The motor according to claim 10 wherein sinusoidal signals 90° apart in phase are applied to the two-axis magnetic elements to generate the continuously moving magnetic field.

17. The motor according to claim 10 wherein the sensor magnetic elements sense the back EMF created by the two-axis magnetic elements.

18. A method of positioning a device, said method comprising:

applying a voltage potential to a plurality of at least two-axis magnetic elements positioned on one of either an inner sphere or an outer sphere to generate moving magnetic fields, one of either the inner sphere or the outer sphere being rotatable relative to the other sphere;

detecting the moving magnetic fields by a plurality of three-axis magnetic elements positioned on the other one of the inner sphere or the outer sphere; and applying a voltage potential to the plurality of three-axis magnetic elements positioned on the other one of the inner sphere or the outer sphere to generate three-axis magnetic fields that interact with the moving magnetic fields to rotate the movable sphere relative to the stationary sphere and position the device.

19. The method according to claim 18 wherein applying a voltage potential to a plurality of two-axis magnetic elements includes applying sinusoidal voltage signals 90° apart in phase to the two-axis magnetic elements to generate the continuously moving magnetic field.

20. The method according to claim 18 wherein detecting the moving magnetic fields includes sensing the back EMF created by the two-axis magnetic elements.

* * * * *